UNITED STATES PATENT OFFICE.

VICTOR G. BLOEDE, OF CATONSVILLE, MARYLAND.

SUBSTITUTE FOR GLUE AND OTHER ADHESIVES.

1,198,100.

Specification of Letters Patent. Patented Sept. 12, 1916.

No Drawing. Application filed January 2, 1915. Serial No. 294.

*To all whom it may concern:*

Be it known that I, VICTOR G. BLOEDE, a citizen of the United States, residing in Catonsville, in the county of Baltimore and State of Maryland, have invented a new and useful substitute for glue and other adhesives capable of successful application in woodworking or other arts or manufactures in which a powerful adhesive is required.

My new composition belongs to that large class of adhesive bodies made from a starch base, and known as vegetable glue, or what in German publications is designated as "pflanzenleim." Many substances of this type have been known and in extensive practical use as adhesives for years. The methods, as well as bases employed in their production are quite varied, but consist of some form of starch, or amylaceous matter, preferably slightly hydrolyzed, either by the application of heat or chemicals, or both, or by acting on the starch suspended in water with a caustic alkali, either cold or in conjunction with heat. The effect of either of these processes is to cause the starch granules to open or break up, thereby forming a smoother and more intimate combination with the water, as well as increasing the adhesive properties of the resulting paste.

I am aware that there is no novelty in any of the methods referred to, as the use of acids, caustic alkali, and, or, heat, in the treatment or starch for the production of adhesive compounds and glue substitutes has been known and employed for over half a century. The composition of matter which forms the subject of this application differs, however, from the products hitherto known or used as adhesives, or glue substitutes, in that it possesses very much greater adhesiveness than other starch products heretofore in use, and when dry is much less soluble in water, and less affected by moisture than animal glue, or the glue substitutes now in use made from vegetable bases.

To produce my composition, I proceed as follows: I first select some form of starch either raw, that is, untreated, or slightly hydrolyzed by any of the well known processes, the degree of conversion, or hydrolyzation, if such be desirable, depending upon the degree of viscosity or stiffness required in the finished product. The species of starch used also depends upon the character of the product desired, wheat, corn, potato, tapioca, sago, or other starches, all being more or less adapted to, or useful for, my purpose. The starch to be operated upon is placed in a mechanical agitator provided with strong paddles, and mixed with two or three times, or more, of its own weight of cold water, the quantity of water used depending upon the character of the starch operated upon, as well as the degree of thickness, or concentration desired in the finished paste. Some starches have a much thinner body, naturally, than other grades or species, and the percentage of water is regulated accordingly. When the water and starch have been thoroughly blended to a smooth cream, I run into this mixture from 5 to 25%, more or less, of the weight of the dry starch of a mixture of caustic soda and plumbate of soda or potash, and with or without the application of heat, let all of the material so blended digest and react until a clear jelly-like paste is formed, the composition being ready for use when this stage is attained, or it may be further reduced with water to any consistency desired.

The caustic soda and plumbate of soda composition, which I generally use in my process, I prepare as follows: To a 40 degree Baumé solution of high test caustic soda I add 5%, more or less, of pure powdered litharge, and agitate the solution until the caustic liquor has taken up all of the lead it will absorb, or dissolve. The liquid is then allowed to settle, when it is ready for use, as described. In practice, I find it better to heat the caustic soda and litharge, as the solution of the lead is thereby greatly facilitated, but if desired, the process can also be worked in the cold. Instead of litharge, the acetate, or other soluble salt of lead may be used in equivalent proportions, these acid salts being decomposed by the caustic alkali, the oxid of lead contained in the lead salts going into solution in the form of plumbate of soda. Where the presence of a large percentage of free alkali in the finished product is objectionable, a very good adhesive can be secured by the addition to raw or partly hydrolyzed starch of an alkaline compound of lead, in the proportion of 1 to 10% of the weight of the dry starch. The operation is practically the same as where a large percentage of alkali is used, the starch being reduced to a cream by agitating with the requisite amount of water, after which the lead compound is added, and the mixture is boiled. More highly converted compounds of starch, such as dextrin and British gum, may be used in the production of my new composition, but for most purposes much better results are secured by the use of raw or slightly hydrolyzed starch, my trials having demonstrated the fact that the higher the body or viscosity of the base from which my compound is made, the greater its adhesive properties.

I do not, of course, confine myself to the use of litharge or other specific compound of lead, as any compound or salt of lead, soluble in alkali, may be substituted, neither do I confine myself to the specific proportions of any of the materials given, or any particular grade or species of starch, as I have found wide variations permissible.

I claim:

1. The herein described paste, or composition of matter consisting of a starch base, water, caustic alkali, and a compound of lead, substantially as described and for the purpose specified.

2. The herein described paste, or vegetable glue compound resulting from the combination of amylaceous matter, caustic alkali, and a compound of lead, substantially as described.

3. The herein described composition of matter resulting from the action of an alkaline lead compound upon starch, or its hydrolyzed derivatives.

VICTOR G. BLOEDE.

Witnesses:
Wm. H. Thomas, Jr.,
H. M. Yoe.